United States Patent [19]
Wölflingseder

[11] 3,928,750
[45] Dec. 23, 1975

[54] CODE CARD AND DECODING NETWORK FOR ELECTRONIC IDENTIFICATION SYSTEM

[76] Inventor: Herbert Wölflingseder, Gartenstrasse 3, 7967 Bad Waldsee, Germany

[22] Filed: July 16, 1973

[21] Appl. No.: 379,712

[30] Foreign Application Priority Data

July 19, 1972 Germany .............................. 2235274

[52] U.S. Cl. .................... 235/61.11 A; 235/61.12 C
[51] Int. Cl.$^2$ ...................... G06K 7/06; G06K 19/06
[58] Field of Search ............235/61.12 N, 61.12 C, 235/61.11 A; 340/173

[56] References Cited

UNITED STATES PATENTS

| | | | |
|---|---|---|---|
| 2,353,061 | 7/1944 | Oldenboom | 235/61.12 C |
| 3,142,823 | 7/1964 | Lewin et al. | 235/61.12 C |
| 3,233,227 | 2/1966 | Petschauer | 235/61.11 A |
| 3,245,054 | 4/1966 | Byron et al. | 235/61.11 A |
| 3,284,781 | 11/1966 | Takahashi | 235/61.11 A |

*Primary Examiner*—Daryl W. Cook
*Attorney, Agent, or Firm*—Ernest G. Montague; Karl F. Ross; Herbert Dubno

[57] ABSTRACT

A key card coacting with a bi-univocally related decoding network has two bus bars on opposite sides and a multiplicity of output leads on each side with first branch conductors extending to the bus bar on the same side and second branch conductors extending through interconnected tabs to the bus bar on the opposite side, severance of one branch conductor of each output lead resulting in a selected pattern of energization of these leads by two different voltages (e.g. of opposite polarity) upon insertion of the card into a decoder provided with a voltage source. The output leads of the card then energize respective terminals of the decoding network which are each connected to an electrical midpoint of a closed circuit loop in one of two groups of such loops, each loop including two normally saturated complementary transistors. The loops of each group have their transistors of like conductivity type connected in parallel across the voltage source which directly applies respective potentials to those midpoints of the loops of the two groups that are disconnected from the corresponding input terminals. The loops are logically interconnected as an AND gate to generate a predetermined voltage on an output terminal if the pattern of energization of the key card complements that of the decoding network.

10 Claims, 3 Drawing Figures

CODE CARD AND DECODING NETWORK FOR ELECTRONIC IDENTIFICATION SYSTEM

FIELD OF THE INVENTION

The present invention relates to a decoding network for an electronic identification system and to an associated key card serving as a code carrier.

BACKGROUND OF THE INVENTION

Devices are already known which mechanically or electronically prevent unauthorized actuation and utilization of a function or program in electric or electronic systems, for instance automobile-ignition locks, scanning of punched cards, scanning of boards provided with magnetic materials, or scanning of credit cards containing embedded semiconductor circuits.

Such means, however, still have various defects, for instance the necessity that the optical allocation of preferably two electric magnitudes in the coding element from two input contact surfaces to several output contact surfaces had heretofore to be effected via an electric or electronic circuit constructed from individually designed components. This means high manufacturing expenses.

OBJECT OF THE INVENTION

It is the object of the present invention to provide means in an electronic identification system for obviating these drawbacks so as to enable economical mass production of code carriers selectively settable to a variety of different combinations and so compact as to accommodate the largest possible number of codings in a small space while assuring absolutely dependable identification.

SUMMARY OF THE INVENTION

In accordance with my present invention, a key card for the selective energization of a multiplicity of input terminals of an electronic identification system with two different electric signal voltages, referred to hereinafter as positive and negative, comprises a flat dielectric body provided on opposite sides with respective conductor arrays each including an input lead and a multiplicity of output leads as well as a bus bar tied to the input lead. Within each array, furthermore, I provide a first group of tabs directly connected to the corresponding bus bar and a second group of tabs separated therefrom, the tabs of the first group on one side of the card registering with the tabs of the second group on the other side and vice versa; the registering tabs are conductively interconnected through apertures in the card body. Each of the output leads of each array is connected by associated branch conductors to a respective tab of the first and the second group, these branch conductors being selectively severable to enable exclusive energization of any output lead from either one of the two input leads upon such severance of one of its branch conductors.

A decoding network adapted to coact with such a key card, in accordance with another feature of my invention, comprises a first and a second supply conductor respectively connected to potentials of positive and negative polarity. The network forms a first and a second group of N parallel closed loops connected across these supply conductors, the N loops of the first group being paired with respective loops of the second group. Each loop is provided with transistor means assuming a normal state of conductivity, such as saturation, upon de-energization of a predetermined control point of each loop and assuming an alternate state of conductivity, such as cutoff, upon energization of that control point with one polarity in the case of the first group and with the other polarity in the case of the second group. A multiplicity of input terminals, equal to the number N of loops in each group, has N first and second branch leads extending therefrom to the control points of an associated loop pair; the first and second supply conductors are supplied with N third and fourth branch leads respectively extending to all the control points of the first and second groups whereby, upon joint severance of first and third branch leads at the loop pairs associated with certain input terminals and joint severance of second and fourth branch leads at the loop pairs associated with the remaining input terminals, a predetermined pattern of energization of the control points is established. When the control points disconnected from the supply conductors are energized in a complementary pattern with the aid of the proper key card, a predetermined voltage is generated on an output terminal of the network.

BRIEF DESCRIPTION OF THE DRAWING

These and other features of my invention will become apparent from the following detailed description given with reference to the accompanying drawing, in which.

SPECIFIC DESCRIPTION

Figure 1:
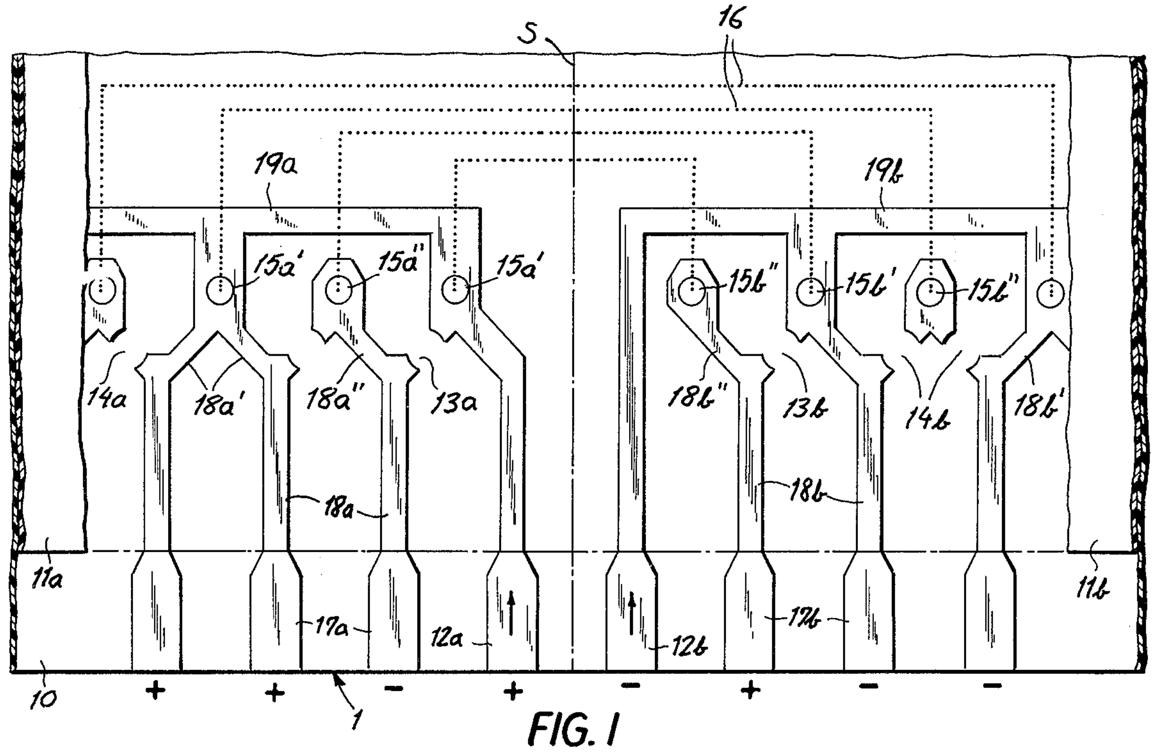
FIG. 1 shows one illustrative conductor pattern on a printed-circuit board forming part of a key card in accordance with my invention.
Figure 2:
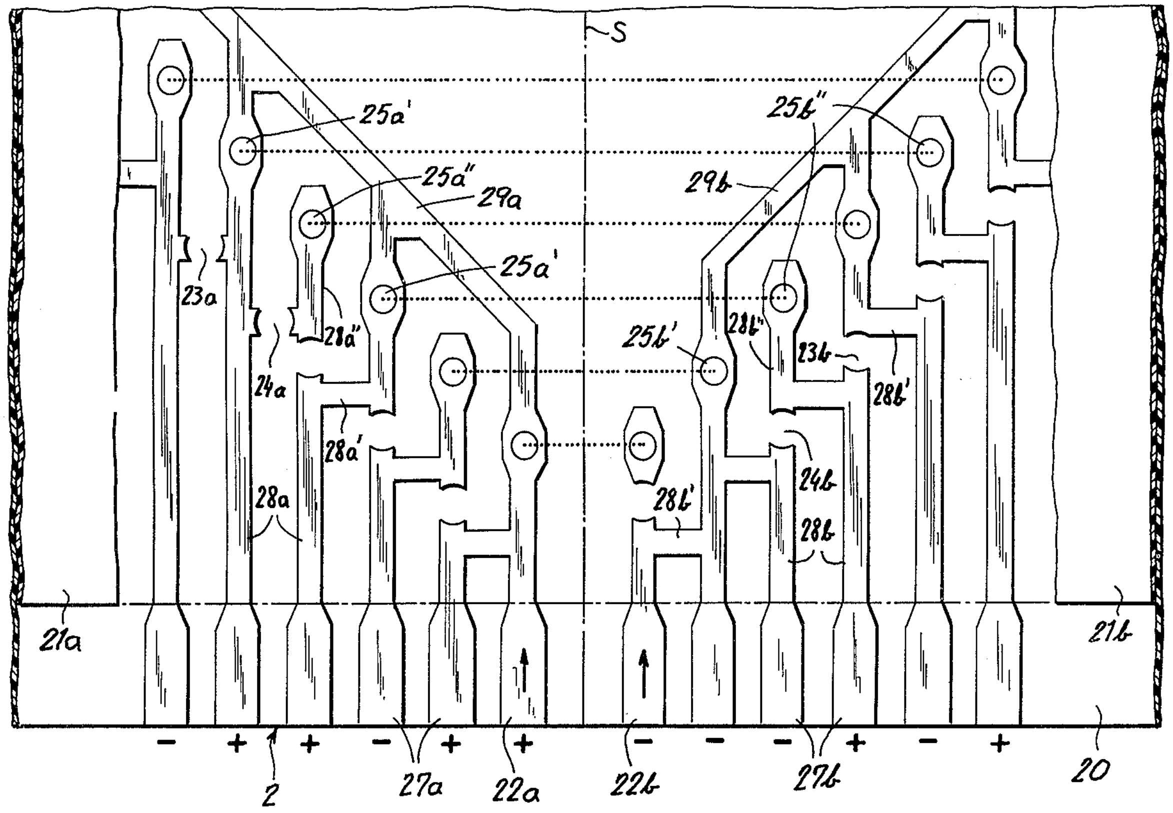
FIG. 2 shows another layout of such a key card.

FIGS. 1 and 2 show each a double-sided key card 1 or 2, the two opposite sides 1*a*, 1*b* and 2*a*, 2*b* thereof being shown as though folded open about a centerline S. The card consists, in known manner, of a body 10 or 20 of insulating material on whose opposite sides respective patterns of conductive material are formed.

Key cards 1 and 2, as shown in FIGS. 1 and 2, comprise a flat dielectric body 10 or 20 with conductor arrays on opposite sides thereof overlain by coatings of colored plastic 11*a*, 11*b* or 21*a*, 21*b*, these coatings covering the entire array with the exception of extremities 12*a*, 12*b* or 22*a*, 22*b* of input leads integral with respective bus bars 19*a* or 29*a* (positive) and 19*b* or 29*b* (negative), and extremities 17*a*, 17*b* or 27*a*, 27*b* of output leads 18*a*, 18*b* or 28*a*, 28*b*. Two groups of tabs 15*a*′, 15*a*″ or 25*a*′, 25*a*″ on the side of the positive bus bar and similar groups of tabs 15*b*′ 15*b*″ or 25*b*′ 25*b*″ on the side of the negative bus bar are tied together by connectros passing through holes in the card body, these connectors being diagrammatically illustrated at 16. The tabs 15*a*′ or 25*a*′ of the first group on the left-hand side are in direct contact with the corresponding bus bar 19*a* or 29*a* and are linked with the tabs 15*b*″ or 25*b*″ of the second group on the right-hand side which are disconnected from the associated bus bar 19*b* or 29*b*. Conversely, the tabs 15*b*′ or 25*b*′ on the right-hand side are directly connected to the latter bus bar and are linked with tabs 15*a*″ or 25*a*″ on the left-hand side disconnected from bus bar 19*a* or 29*a*.

Each output lead 18*a* or 28*a* is initially connected via a branch conductor 18*a'* or 28*a'* to a tab of the first group, and thus to the positive bus bar 19*a* or 29*a;* another branch conductor 18*a''* or 28*a''* extends initially to a tab of the second group, thus forming a path to the opposite bus bar 19*b* or 29*b*. Analogous connections exist between output leads 18*b* or 28*b* and the two groups of tabs by way of respective branch conductors 18*b'* or 28*b'* and 18*b''* or 28*b''*.

As further shown in FIGS. 1 and 2, one of the two branch conductors of any output lead on each side of the card is severed by a gap to disconnect that lead from either the positive or the negative bus bar, these gaps being designated 13*a*, 13*b* or 23*a*, 23*b* in the first instance and 14*a*, *l* *14b* or 24*a*, 24*b* in the second instance. Thus, an initially selectable but permanent pattern of energization of all the output leads is established, by means of stencils or automatic equipment, before the coatings 11*a*, 11*b*, 21*a* or 21*b* are applied to conceal the entire conductor array except for the projecting extremities.

The modification shown in FIG. 2 is a variant which has the advantage that the available space is fully utilized with minimum spacing between the input and output leads 22*a*, 22*b* and 27*a*, 27*b*. This result is obtained in particular by the staggered arrangement of the tabs 25*a'*, 25*a''* 25*b'*, 25*b''* and of the points of interruption which are not located in longitudinal and transverse branches 28*a''*, 28*b''* and 28*a'*, 28*b'*.

Figure 3:
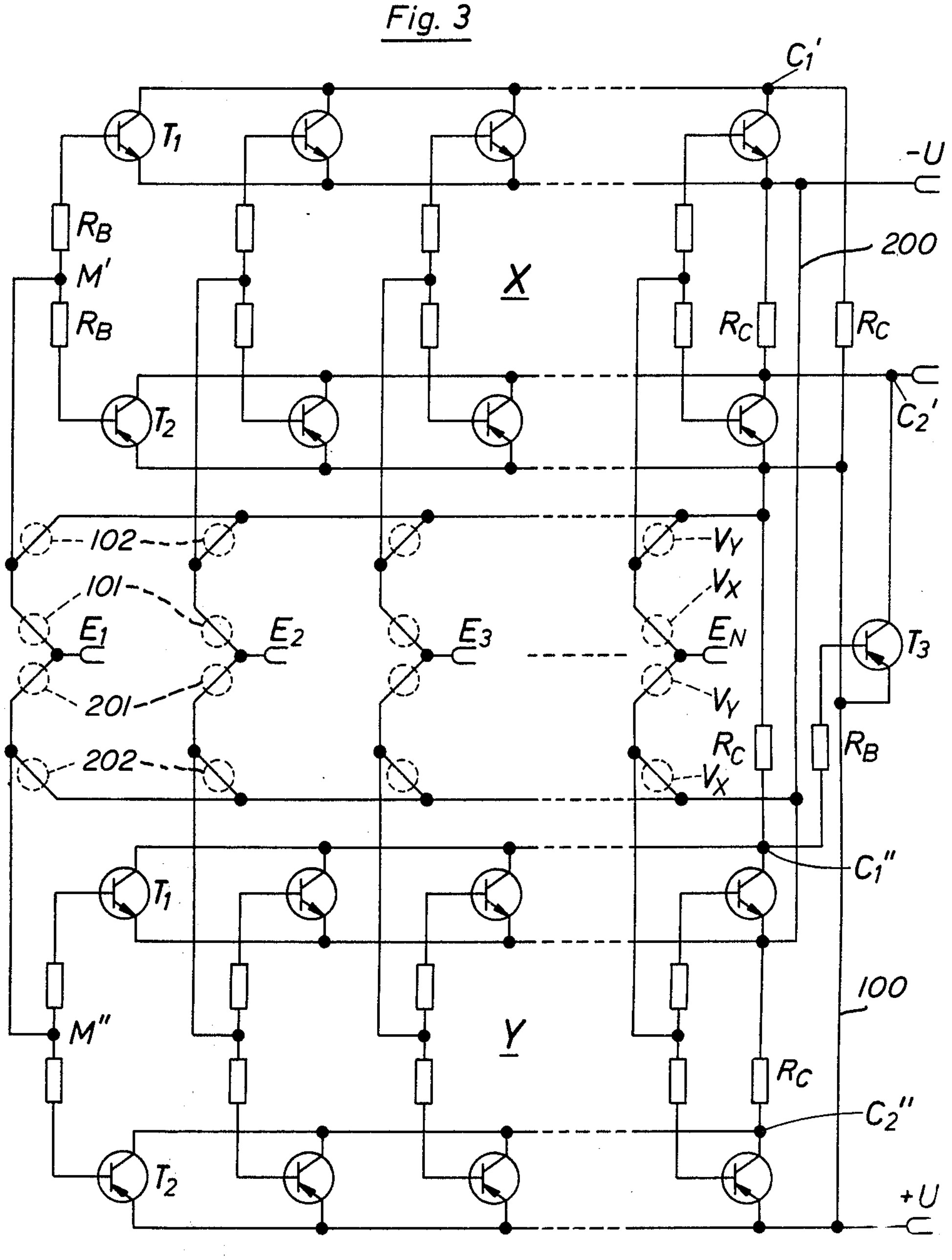
FIG. 3 shows a circuit diagram of a decoding network adapted to be used with a key card according to FIG. 1 or 2.

In FIG. 3 I have shown a decoding network with a positive supply conductor 100, a negative supply conductor 200 and N.

Terminals $E_1$ to $E_N$ coacting with respective outputs 17*a*, 17*b* or 27*a*, 27*b* of a key card 1 or 2 as shown in the preceding Figures. Each of these terminals is initially connected via interruptable branch leads 101, 201 to 2N control points represented by the electronically symmetrical center taps or electric midpoints M', M'' of a pair of closed circuit loops which extend from potential −U on bus bar 200 via the emitter-base diode of an NPN transistor $T_1$ two series resistors $R_B$ and the base-emitter diode of a PNP transistor $T_2$ to potential +U on bus bar 100. Other severable branch leads 102, 202 link the taps M', M'' directly with conductors 100 and 200, respectively.

Each of the two complementary transistors $T_1$, $T_2$ of a pair is in saturated conductive condition when the electronic midpoint M' or M'' thereof is de-energized, i.e., when that midpoint is disconnected at 102 or 202 from the associated bus bar and when no key card is in place. Thus a maximum collector current, limited by a resistor $R_c$, flows and the collector potential reaches a value close to the emitter potential, i.e. −U for the NPN transistor and +U for the PNP transistor.

The 2N pairs of transistors, forming two groups X and Y, are connected in parallel with all collectors and emitters of the NPN transistors as well as all collectors and emitters of the PNP transistors of each group galvanically interconnected.

In this way each of the two common collector points can be designated as output of an electronic NAND circuit whose inputs are the N center taps of the closed loops of each group. The common collector point $C_1'$, $C_1$ of all NPN transistors of a group receives the potential $+U$ when and only when a cut-off potential close to $-U$ is applied to or impressed on all corresponding input terminals it being assumed that the supply voltage or current is not materially changed by the connected load.

Similarly, the common collector point $C_2'$, $C_2$ of all PNP transistors of a group changes to the potential −U when and only when a cut-off voltage +U is impressed on all input terminals thereof.

The two groups X, Y of N transistor-pair circuits each are so interconnected via a PNP output transistor $T_3$ lying in parallel with transitors $T_2$ of group X, that the two NAND gates constituted by transistors $T_2$ of group X and $T_1$ of group Y perform an AND function, causing the appearance of potential −U at point $C_2'$ when and only when all these transistors are blocked, i.e., if and only if a potential close to +U is impressed at all X inputs and a potential close to −U at all Y inputs. The common collector point $C_1''$ is connected to a control (base) lead of output transistor $T_3$ so as to cut that transistor off upon a blocking of all the NPN transistors $T_1$ of group Y.

With selective severance of two branch leads 101, 202 or 201, 102 at each terminal $E_1$ - $E_N$, half the number of points M', M'' are energized whereas the other half (totaling N) are de-energized in a pattern representing one of $K = 2^N$ possible combinations whereby only a complementary pattern on one of as many different key cards is able to cause the appearance potential $-U$ at the output $C_2'$.

By virtue of the electronically symmetrical center tap of a closed loop, a significant change in current flow through that circuit requires in all cases the application of a potential +U or −U and cannot be brought about by the absence of voltage as caused for instance by a poor contact point.

Similarly, as a result of the completely symmetrical design of the closed circuit, a high degree of safety is provided against a determination of the individual combination of the required polarity pattern by electric means such as instruments for the measurement of an input resistance.

For less demanding situations, however, all NPN transistors $T_1$ can be dispensed with in the case of group X and all PNP transistors $T_2$ in the case of group Y by connecting the loops directly, rather than via transistors $T_1$ of group X, to supply conductor 200 and, rather than by the transistors $T_2$ of group Y, directly to supply conductor 100. In this way about one-half of the transistors can be eliminated.

The decoding network can be constructed from very cheap semiconductor elements such as integrated circuits, with the use of field-effect transistors instead of the junction transistors shown. It need not perform any storage function, since the key card stores the code, and is therefore highly insensitive to disturbances. Furthermore, it does not make high demands with respect to switching speed.

The decoding network is advantageously built up on a printed circuit and, in contradistinction to the code carrier or key card, remains fixed in place or fixed on the apparatus.

The bi-universal association of the input terminals $E_N$ with the closed circuits of groups X and Y is effected, after the mass production of the basis network by interrupting the conductive paths at the points 101, 102, 201, 202 as discussed above.

I claim:

1. A key card for the selective energization of a multiplicity of terminals of an electronic identification system with two different electric signal voltages, comprising:

a flat dielectric body provided on opposite sides with respective conductor arrays each including an input lead and a multiplicity of output leads, a bus bar tied to said input lead, a first group of tabs directly connected to said bus bar, and a second group of tabs separated from said bus bar, the tabs of said first group on one of said sides registering with the tabs of said second group on the other of said sides and vice versa, the registering tabs being conductively interconnected through apertures in said body; and selectively severable branch conductors in each of said arrays connecting each of said output leads to a respective tab of said first and said second group, thereby enabling exclusive energization of any output lead from either one of the input leads upon selective severance of one of its branch conductors.

2. A key card as defined in claim 1 wherein said body is provided with insulating coatings overlying both conductor arrays except the extremities of said input and output leads.

3. A key card as defined in claim 1 wherein said output and input leads extend parallel to one another toward the respective bus bars.

4. A key card as defined in claim 3 wherein said apertures are disposed on a straight line paralleling said bus bars.

5. A key card as defined in claim 4 wherein the tabs of said first and second groups alternate along said line.

6. A key card as defined in claim 4 wherein said bus bars and said line extend at an acute angle to said input and output leads.

7. In an electronic identification system, in combination:

a decoding network comprising a first supply conductor and a second supply conductor respectively connected to potentials of a first and second polarity, a first and second group of N parallel closed loops connected across said supply conductors, the N loops of said first group being paired with respective loops of said second group, said loops being provided with transistor means assuming a normal state of conductivity upon de-energization of a predetermined control point of each loop and assuming an alternate state of conductivity upon energization of said control point with said first polarity in the case of said first group and with said second polarity in the case of said second group; said network further comprising a multiplicity of input terminals, equal to the number N of loops in each group, having N first and second branch leads extending therefrom to the control points of an associated pair of loops of said first and second groups, respectively, said first and second supply conductors being provided with N third and fourth branch leads respectively extending to all the control points of said first and second groups, said first and third branch leads being jointly severable at loop pairs associated with certain of said input terminals and said second and fourth branch leads being jointly severable at loop pairs associated with the remaining input terminals for establishing a predetermined pattern of energization of said control points; and a key card for the energization of said control points with a complementary pattern, said key card carrying two conductor arrays each including an input lead respectively energizable with potentials of said first and second polarity, a multiplicity of output leads and a pair of severable branch conductors linking each output lead to said bus bars, the output leads of both arrays being individually engageable with respective input terminals of said network for applying said potentials thereto in a pattern complementary to the pattern of energization of said control points for generating a predetermined voltage on an output terminal of said network.

8. The combination defined in claim 7 wherein said transistor means includes N parallel PNP transistors in the loops of said first group and N parallel NPN transistors in the loops of said second group connected to be saturated in a de-energized state of the respective control points.

9. The combination defined in claim 8 wherein said transistor means further includes an NPN transistor in series with each PNP transistor in the loops of said first group, a PNP transistor in series with each NPN transistor in the loops of said second group, and a voltage divider between the complementary series transistors of each loop, said control points being electronically symmetrical center taps on said voltage dividers.

10. The combination defined in claim 8, further comprising an output transistor connected in parallel with said N transistors of one group and provided with a control lead connected in parallel to said N transistors of the other group for cutting off said output transistor upon simultaneous blocking of all said transistors of said other group, said output terminal being connected to corresponding electrodes of said output transistor and said N transistors of said one group for generating said predetermined voltage thereon only upon simultaneous blocking of the last-mentioned transistors.

* * * * *